C. H. WEAVER.
TRAIN LINE VALVE.
APPLICATION FILED FEB. 14, 1920.
1,389,465.
Patented Aug. 30, 1921.
2 SHEETS—SHEET 1.
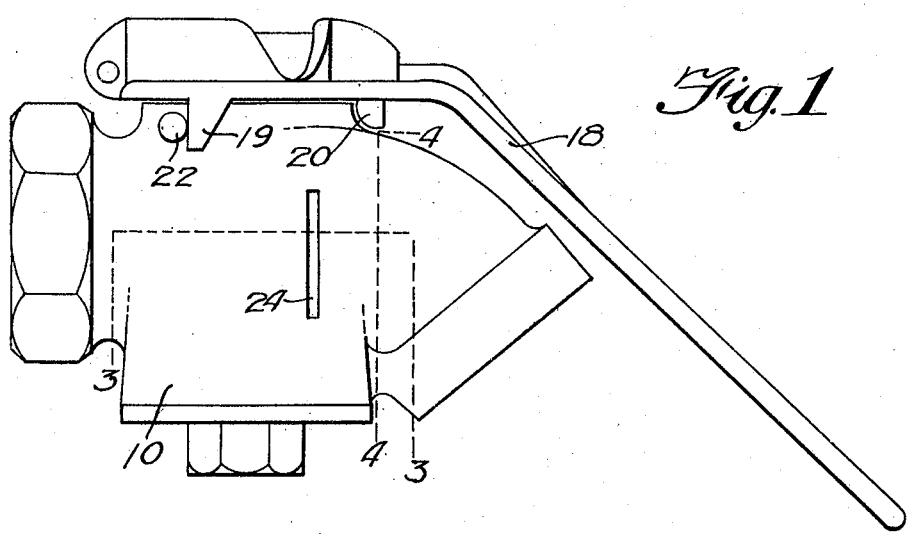
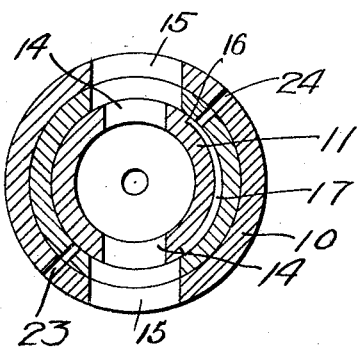
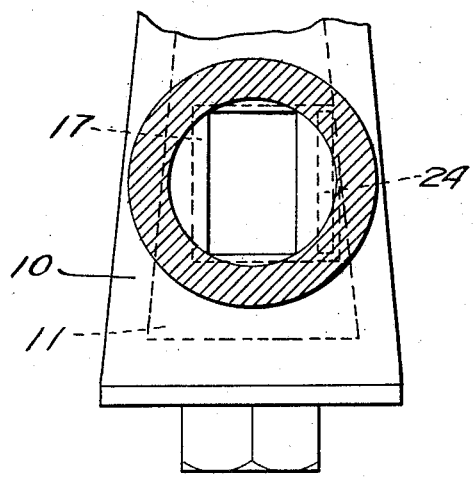
C. H. Weaver
INVENTOR
BY Victor J. Evans
ATTORNEY
WITNESS:

C. H. WEAVER.
TRAIN LINE VALVE.
APPLICATION FILED FEB. 14, 1920.
1,389,465.
Patented Aug. 30, 1921.
2 SHEETS—SHEET 2.
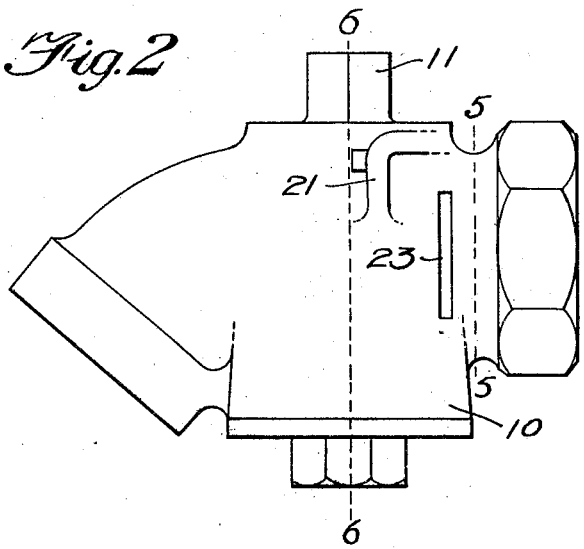
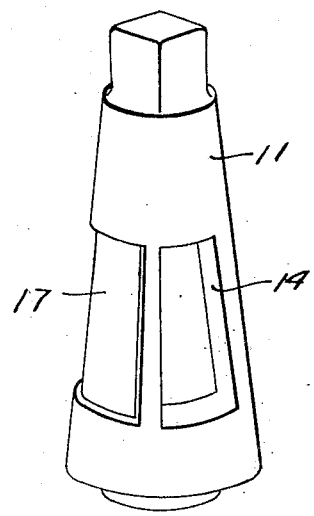
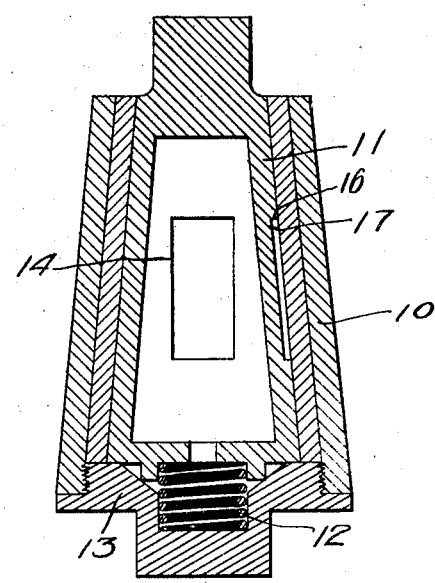
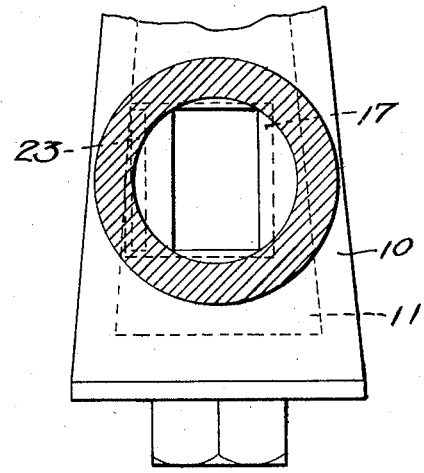
C. H. Weaver
INVENTOR
BY Victor J. Evans
ATTORNEY
WITNESS:

UNITED STATES PATENT OFFICE.

CHARLES H. WEAVER, OF BEAUMONT, TEXAS.

TRAIN-LINE VALVE.

1,389,465.  Specification of Letters Patent.  Patented Aug. 30, 1921.

Application filed February 14, 1920. Serial No. 358,603.

*To all whom it may concern:*

Be it known that I, CHARLES H. WEAVER, a citizen of the United States, residing at Beaumont, in the county of Jefferson and State of Texas, have invented new and useful Improvements in Train-Line Valves, of which the following is a specification.

This invention has reference to a cut out cock for pneumatic air brake systems.

The object is to produce a cock for this purpose whereby the line may be bled to supply the brakes either to the front or to the rear of the cock, the construction being such as to permit of all the brakes being simultaneously applied, when desired.

The foregoing and other objects which will appear as the nature of the invention is better understood, may be accomplished by a construction, combination and operative arrangement of parts such as is illustrated by the drawings.

In the drawings:—

Figure 1 is a side elevation of a cut out cock for pneumatic brake systems, in accordance with this invention.

Fig. 2 is a similar view but looking toward the opposite side of the cock.

Fig. 3 is a sectional view approximately on the line 3—3 of Fig. 1.

Fig. 4 is a sectional view on line 4—4 of Fig. 1 illustrating the arrangement of the plug when the brakes are to be applied, say ahead of the cock.

Fig. 5 is a similar view showing the position of the plug when the brakes are to be applied to the rear of the cock.

Fig. 6 is a sectional view approximately on the line 6—6 of Fig. 2.

Fig. 7 is a perspective view of the plug.

My improvement is illustrated in connection with an angle cock, but of course, the same may be applied to a straight cut out cock.

The body of the cock is indicated by the numeral 10 and has centrally arranged therein the usual plug 11. The bottom of the plug is contacted by a spring 12 which is retained in the body 10 by a bushing 13. The plug is cone shaped in the usual manner and has a straight passage 14 therethrough communicating with the ports 15 of the body. To one side of the straight passage, indicated for distinction by the numeral 16 I depress the plug forming the same with what may be termed a pocket 17.

On the reduced end of the plug is the usual lug to which is attached the operating handle 18. The handle is provided with downstanding fingers 19 and 20, and the body is provided with stop lugs 21 and 22.

The sides of the body are provided with diagonally disposed bleed ports 23 and 24 respectively. When the plug is turned to one position the straight passage in the plug will communicate with the ports of the said body, when turned to another position the ports will be closed. When turned to still another position a communication will be maintained between one of the inlet ports of the body and the pocket in the plug, and say the outlet port 23. This permits the air to escape from ahead of the cock and consequently applies the brake to the cock ahead of the plug. When the plug is turned to another position a passage is obtained between the second port of the cock and the second bleed port 24 through the medium of the pocket in the plug which allowing the air to escape will apply the brakes to the rear of the cock.

It is thought that the foregoing description will set forth the construction, application, operation and advantages of the construction.

Having thus described the invention, what I claim is:—

A cut out cock for a pneumatic train brake system comprising a body having a pair of ports arranged in its opposite sides and having a pair of bleed ports disposed diagonally in its sides adjacent to said ports aforesaid, a hollow rotatable cone-shaped plug having a pair of ports arranged in its opposite sides and having a pair of bleed ports disposed diagonally in its sides adjacent to said ports aforesaid, a hollow rotatable cone-shaped plug having a pair of ports arranged in its opposite sides adapted to be brought into registry with the ports in the body and having a pocket formed in its outer wall intermediate its ports and adapted to connect one of said bleed ports with the adjacent port in the body, a bushing secured to the bottom of said body, a coil spring carried by said bushing and engaging the base of said plug, a lug formed upon the reduced end of said plug, stop lugs disposed on opposite sides of said body and an operating handle carried by the lug on said plug having depending lugs adapted to engage said stop lugs aforesaid.

In testimony whereof I affix my signature.

CHARLES H. WEAVER.